United States Patent [19]

Huggett et al.

[11] Patent Number: 5,468,945
[45] Date of Patent: Nov. 21, 1995

[54] METHOD AND APPARATUS FOR LOCATING AND DECODING A POSTNET FORWARDING BAR CODE IN A FIELD OF POSTNET BAR CODES

[75] Inventors: George R. Huggett, Mercer Island; William M. McDonald, Lake Stevens, both of Wash.

[73] Assignee: Intermec Corporation, Everett, Wash.

[21] Appl. No.: 201,764

[22] Filed: Feb. 25, 1994

[51] Int. Cl.[6] .................................................. G06K 7/10
[52] U.S. Cl. .................................. 235/462; 235/494
[58] Field of Search ................................ 235/462, 472, 235/494

[56] References Cited

U.S. PATENT DOCUMENTS

| | | | |
|---|---|---|---|
| 4,445,635 | 5/1984 | Barr | 229/73 |
| 4,565,317 | 1/1986 | Kranz | 229/73 |
| 4,822,986 | 4/1989 | Guthmueller et al. | 235/462 |
| 4,945,218 | 7/1990 | Talbott | 235/487 |
| 4,958,064 | 9/1990 | Kirkpatrick | 235/384 |
| 5,155,343 | 10/1992 | Chandler et al. | 235/462 |
| 5,262,623 | 11/1993 | Batterman et al. | 235/454 |

*Primary Examiner*—John Shepperd
*Assistant Examiner*—Michael G. Lee
*Attorney, Agent, or Firm*—Seed and Berry

[57] ABSTRACT

A method and apparatus for locating multiple bar codes in a field. The apparatus includes a microcomputer programmed to detect the existence of bar codes in location cells in the field and then apply a location score to each location cell. Based on the scores assigned to the location cells, a particular location cell is selected and the location cells surrounding the selected cell are analyzed to determine whether they might contain a bar code segment. A location cell that is determined to be sufficiently likely to contain a bar code segment will be appended to the first selected location cell. In this manner, a bar code in the field can be located. The determination of whether the located bar code is a primary or a secondary bar code is made by further analyzing the located bar code. The further analyses may be to determine the located bar code's length, whether it has a predetermined prefix, or whether it has a predetermined pattern of descenders from its constituent line segments.

A preferred embodiment of the inventive method and apparatus analyzes the image recorded in the field to locate areas containing Postnet bar codes. The number of bars in each Postnet bar code found in the field is then counted and a determinatinon is made as to whether the number of bars in the Postnet bar code equal a valid number of bars. If the field contains only a bar code containing a valid number of bars, that Postnet bar code is decoded to provide a valid ZIP code. If, however, a Postnet bar code is found in the field that does not contain a valid number of bars, the Postnet bar code is flagged as a forwarding Postnet bar code. The Postnet portion of the Postnet bar code is then decoded to provide a valid forwarding ZIP code.

10 Claims, 4 Drawing Sheets

METHOD AND APPARATUS FOR LOCATING AND DECODING A POSTNET FORWARDING BAR CODE IN A FIELD OF POSTNET BAR CODES

FIELD OF THE INVENTION

This invention relates to the field of machine-readable symbols, and particularly to a method and apparatus for high speed omnidirectional recognition or distinction of two or more classes of bar code symbols.

BACKGROUND OF THE INVENTION

U.S. Pat. No. 5,155,343, "OMNIDIRECTIONAL BAR CODE READER WITH METHOD AND APPARATUS FOR DETECTING AND SCANNING A BAR CODE SYMBOL," discloses a bar code reader which provides for high speed omnidirectional reading of a bar code symbol which may be at a random orientation, distance and relative motion with respect to the reader. The teachings of U.S. Pat. No. 5,155,343 may be used to implement the inventive concepts described and claimed herein, and this patent is therefore hereby incorporated by reference.

Frequently a field containing one bar code symbol may also possibly contain a second bar code symbol which represents information that differs from the information represented by the first bar code symbol. If the locations of either of these two bar code symbols are not known *a priori*, it can be important to be able to distinguish them so that they may be interpreted properly. This is particularly the case where the symbologies of the two bar code symbols are identical and some indicia other than the information actually encoded must be used to distinguish which of the two types of bar code symbology is used to encode a particular symbol.

One important context in which this problem arises is in the placement of Postnet bar code symbols. While the problem if misplacement and misorientation of a primary Postnet bar code symbol is described in detail in the above-referenced patent applications, it is possible that a so-called computerized forwarding system (CFS) label may also be placed in the same field as the original Postnet bar code symbol. Typically, this will take place if it is determined by a human or machine reading the first bar code symbol that some information concerning the addressee of a piece of mail has changed, necessitating that this information be updated on the piece of mail. One common example occurs when the addressee of a piece of mail moves to a new address. To preserve the efficiency of the Postnet system, this updated information should be placed directly upon the piece of mail.

It is particularly useful if the CFS label is printable by the same method as the original Postnet symbol, for example, by a dot matrix printer. Therefore, it is particularly efficient to use the same kind of symbology for the secondary CFS bar code as is used for the primary Postnet symbol. This requires that an automatic recognition system such as that described in the above-mentioned patent applications can also be used to interpret the information contained in both bar code symbols. It also requires that the automatic recognition system be able to determine which symbol is the primary Postnet symbol and which is the secondary CFS symbol.

The present invention is embodied in a bar code reader in which bar codes are rapidly and reliably read. Furthermore, a bar code reader in accordance with the present invention provides for high speed omnidirectional reading of secondary bar code symbols, which may be at a random orientation, distance and relative motion with respect to the reader.

SUMMARY OF THE INVENTION

According to one aspect, the present invention is an apparatus for locating two or more distinct bar code symbols located in the same field. The apparatus comprises means for recording an image of the field in a memory, means for analyzing the image recorded in the memory to locate areas potentially containing all of the distinct types of bar code symbols, and means for scoring each of the areas potentially containing all of the distinct types of bar code symbols. The apparatus further comprises means for comparing the scores of each of the areas containing a particular one of the types of distinct bar code symbols and for determining which of the areas most probably contains one of the particular types of distinct bar code symbols, and means for comparing the scores of each of the areas containing another particular one of the types of distinct bar code symbols and for determining which of the areas most probably contains another one of the particular types of distinct bar code symbols.

According to another aspect, the invention is a method for locating two or more distinct bar code symbols located in the same field. The method comprises the steps of: a) recording an image of the field in a memory, b) analyzing the image recorded in the memory to locate areas potentially containing all of the distinct types of bar code symbols, and c) scoring each of the areas potentially containing all of the distinct types of bar code symbols. The method further comprises the steps of d) comparing the scores of each of the areas containing a particular one of the types of distinct bar code symbols and for determining which of the areas most probably contains one of the particular types of distinct bar code symbols, e) comparing the scores of each of the areas containing another particular one of the types of distinct bar code symbols, and f) determining which of the areas most probably contains another one of the particular types of distinct bar code symbols.

DETAILED DESCRIPTION OF THE INVENTION

Figure 1A:
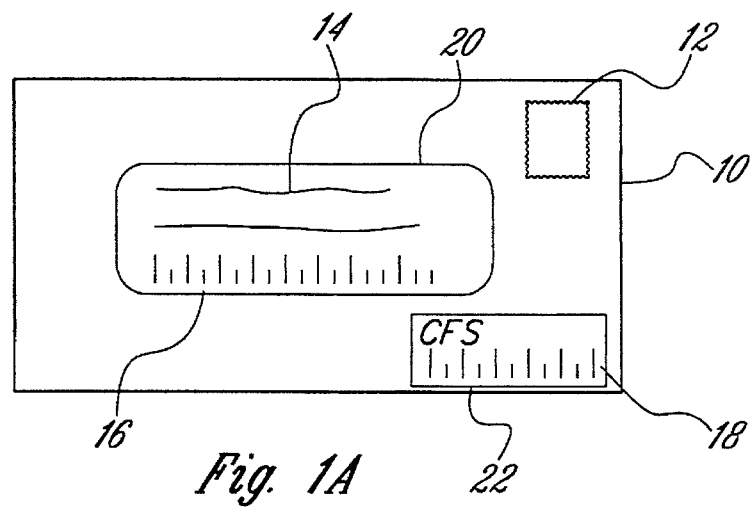
FIG. 1A is a schematic drawing of a first piece of flat mail showing distinct primary and secondary bar code symbols.
Figure 1B:
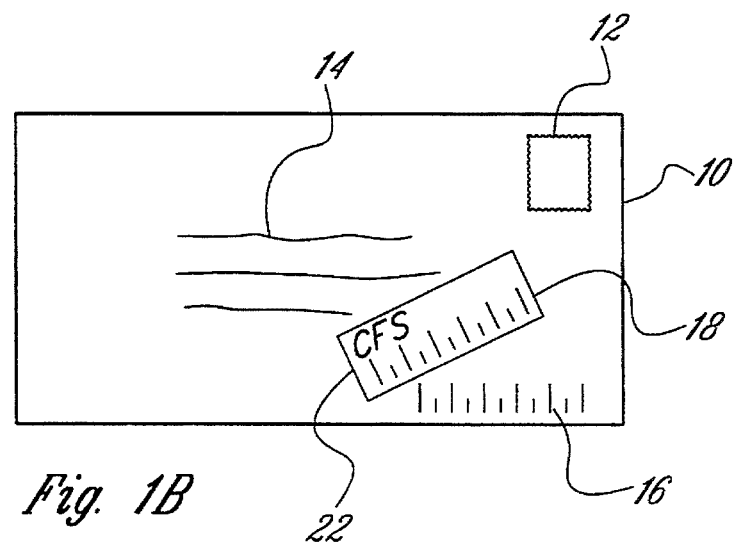
FIG. 1B is a schematic drawing of a second piece of flat mail showing distinct primary and secondary bar code symbols.

FIGS. 1A and 1B are respectively schematic drawings of first and second pieces of flat mail, each showing distinct primary and secondary bar code symbols. The pieces of mail 10 are generally flat pieces having a surface upon which is placed postage 12, an address 14 for the addressee, a first bar code 16 and a second bar code 18. The first bar code 16 is a first symbology encoding machine-readable information about the addressee. The second bar code 18 is a second symbology encoding further information about the addressee. While the first bar code 16 can be supplied on a single address label 20 with humanreadable information about the addressee (see FIG. 1A), it can also be printed directly on the piece of mail 10 (see FIG. 1A). The second bar code 18 is generally printed on a separate label 22 which is attached to the piece of mail 10 after interpreting the human-readable information and/or the information encoded in the first bar code symbol 16. However, the information contained on the separate label 22 could also be printed on the piece of mail 10 by a conventional dot matrix printer. As shown in FIGS. 1A and 1B, the label 22 can be placed in any random position and orientation on the piece of mail 10. Furthermore, the address 14 and/or the first bar code 16 could also be placed in any random position and orientation on the piece of mail 10.

One aspect of interpreting the bar code information placed on the piece of mail 10 is to distinguish the first bar code 16 from the second bar code 18, since they represent different information. If the pieces of mail shown in FIGS. 1A and 1B are intended for use with the Postnet system, it is important to be able to distinguish the information on the CFS label 22, since this information generally updates or corrects the information contained on the pieces of mail 10 when it is deposited in the mail. As an example, the label 22 could contain a forwarding address for the addressee of the piece of mail 10.

Figure 2:
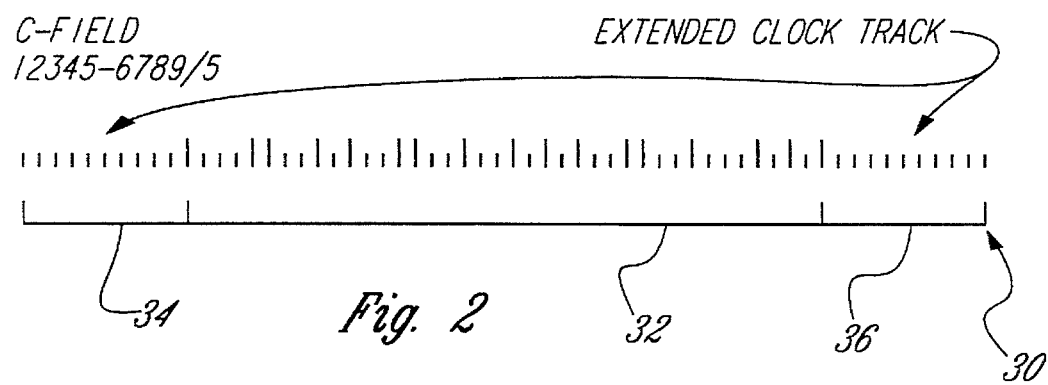
FIG. 2 is a drawing of a first form of a bar code symbology for use in accordance with the present invention.

FIG. 2 is a drawing of a first form of a bar code symbology for use in accordance with the present invention. The bar code 30 includes a number of parallel line segments or bars which are of two lengths. Each of the bars is placed periodically and aligned at one end along a common line. The mixture of short and long bars in the middle section 32 of the bar code is determined by the encoding which is applied to the bar code, such as is disclosed in the Postnet symbology. However, the bar code 30 is extended beyond the middle section 32 by a predetermined number of short bars by end sections 34 and 36 positioned both before and after the Postnet bar code forming the middle section 32. As is known in the prior art, the periodic placement of the bars can serve to establish timing when decoding the information contained in the bar code. However, the existence of the end section 34 and 36 can serve to identify the bar code 30 as a secondary bar code, such as might be used on a CFS label 22 or forwarding bar code since the number of bars in the forwarding bar code will not match the number of bars in a valid Postnet bar code. These additional bars can advantageously be deleted in the same manner and with the same equipment used to detect the bars in the Postnet bar code since the additional bars in the forwarding bar code are identical to some of the bars in the Postnet bar code. Once the forwarding bar code has been detected, the Postnet bar code forming part of the forwarding bar code can be decoded in a conventional manner. If the number of bars in the bar code in the field does match the number of bars in a valid Postnet bar code, then the forwarding bar code is not present in the field and the Postnet bar coded will be decoded in a conventional manner.

Figure 3:
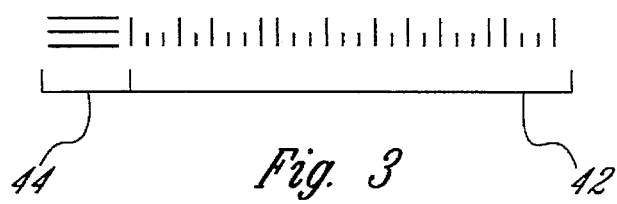
FIG. 3 is a drawing of a second form of a bar code symbology for use in accordance with the present invention.

FIG. 3 is a drawing of a second form of a bar code symbology for use in accordance with the present invention. The bar code 40 has two sections, an information section 42 and an identifier section 44. The information section 42 consists of a periodically placed series of short and long line segments which are encoded according to some symbology. The identifier section 44 consists of a series of parallel line segments which are perpendicular to the line segments that make up the information section 42. The existence of the identifier section 44 can serve to identify the bar code 40 as a secondary bar code, such as might be used on a CFS label 22.

Figure 4:
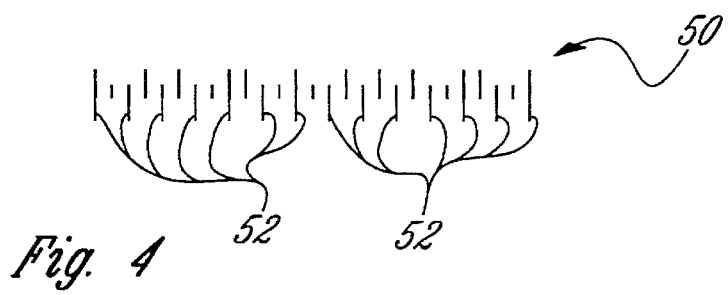
FIG. 4 is a drawing of a third form of a bar code symbology for use in accordance with the present invention.

FIG. 4 is a drawing of a third form or a bar code symbology for use in accordance with the present invention. The bar code 50 consists of an array of parallel line segments similar to those shown in the middle section 32 of the bar code 30 shown in FIG. 2, and the upward extensions of the bar code 30 are used to encode the bar code according to the symbology in use. However, starting with the first line segment in the bar code 50, every other line segment also has a downward extension 52, or descender, which can be used to identify the bar code 50 as a secondary bar code.

Figure 5:
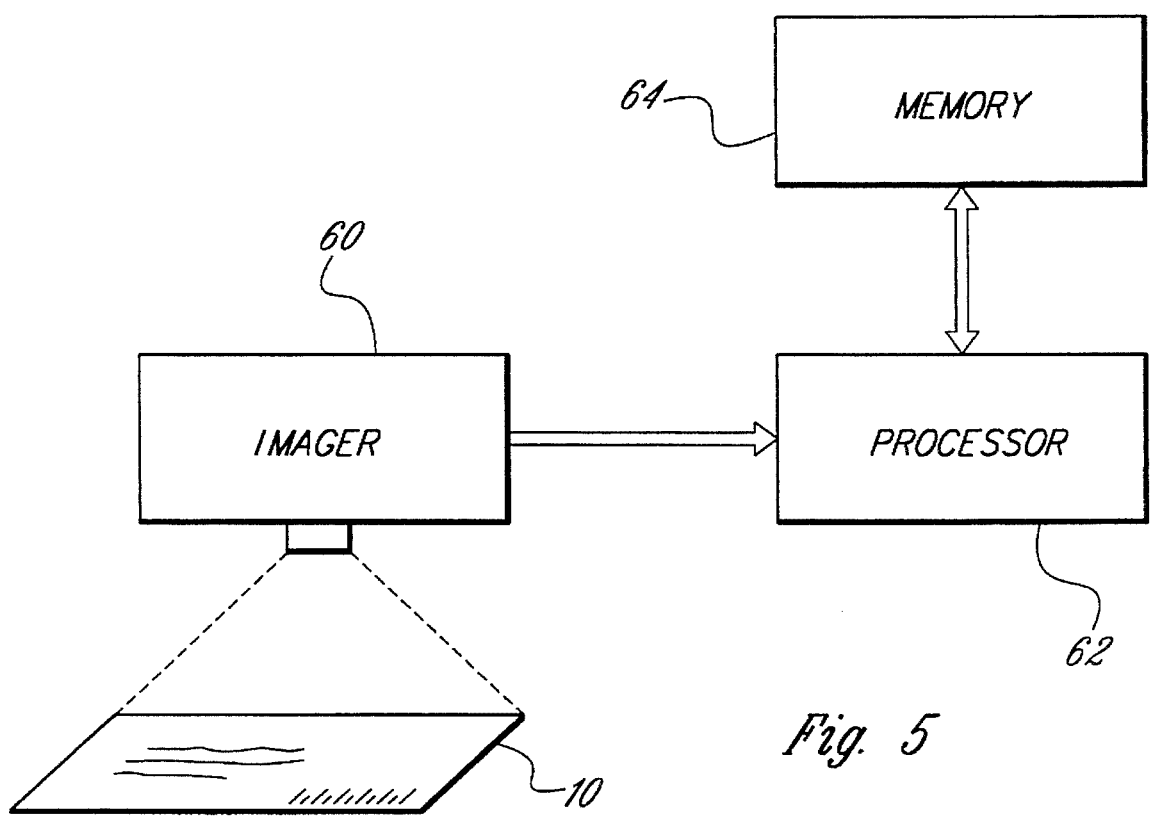
FIG. 5 is a block diagram of a preferred embodiment of the inventive bar code reader.

Regardless of the type of bar code symbology used on the piece of mail 10, it may be read and interpreted by the preferred embodiment shown in FIG. 5. The piece of mail 10 passes beneath a conventional bar code imager 60. The imager 60 outputs image data to a conventional processor 62 connected to a memory 64 which preferably includes random access memory ("RAM") for storing image data and data derived from the image data. The memory 64 may also include read only memory ("ROM") for storing a computer program for the processor 62.

Figure 6:
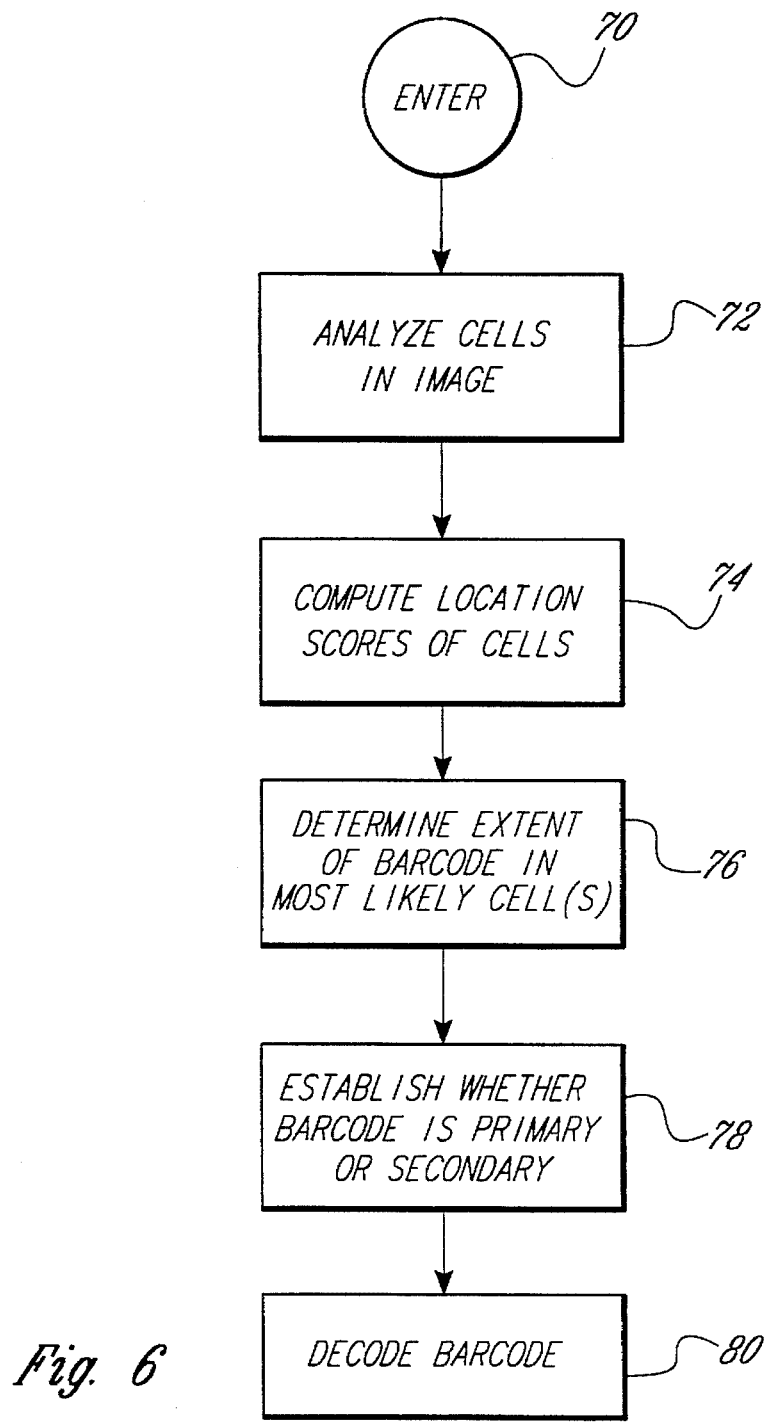
FIG. 6 is a flow chart of a computer program used in the preferred embodiment of FIG. 5 for locating multiple bar code symbols in a field in accordance with the present invention.

FIG. 6 is a flow chart of a program for causing the processor 62 (FIG. 5) to locate multiple bar code symbols in a field in accordance with the present invention. The purpose of this portion of the computer program is to locate a bar code by analyzing the location cells in an image based on a location scoring scheme and then further analyzing the located bar code to determine whether it is a primary bar code or a secondary bar code. Some of the steps shown in the flow chart are described in the above-mentioned U.S. Pat. No. 5,155,343. After entering the program at point 70, the various location cells in the image are analyzed and location scores for each of the cells are determined at steps 72 and 74, respectively. Next, the extent of the bar code which passes through a cell located in the previous steps is determined at step 76.

In schemes where only one type of bar code is expected, the computer program would now move to decode the bar code at step 80. However, if there are primary and secondary (and, possibly, further) types of bar codes also present in the image, they can be analyzed in step 78 before being decoded at step 80. In the case of the secondary bar code of the type shown in FIG. 2, the location cells can be analyzed to determine the length of the bar code. If it is of sufficient length, the bar code can be inferred to be a secondary bar code. In the case of a secondary bar code of the type shown in FIG. 3, the location cells at the beginning of the bar code can be analyzed to determine whether they contain a series of parallel line segments that are perpendicular to the line segments in the information section of the bar code. In the case of a secondary bar code of the type shown in FIG. 4, the location cells can be analyzed to determine whether the line segments in the bar code have descenders. If they do, the bar code can be inferred to be a secondary bar code.

Figure 7:
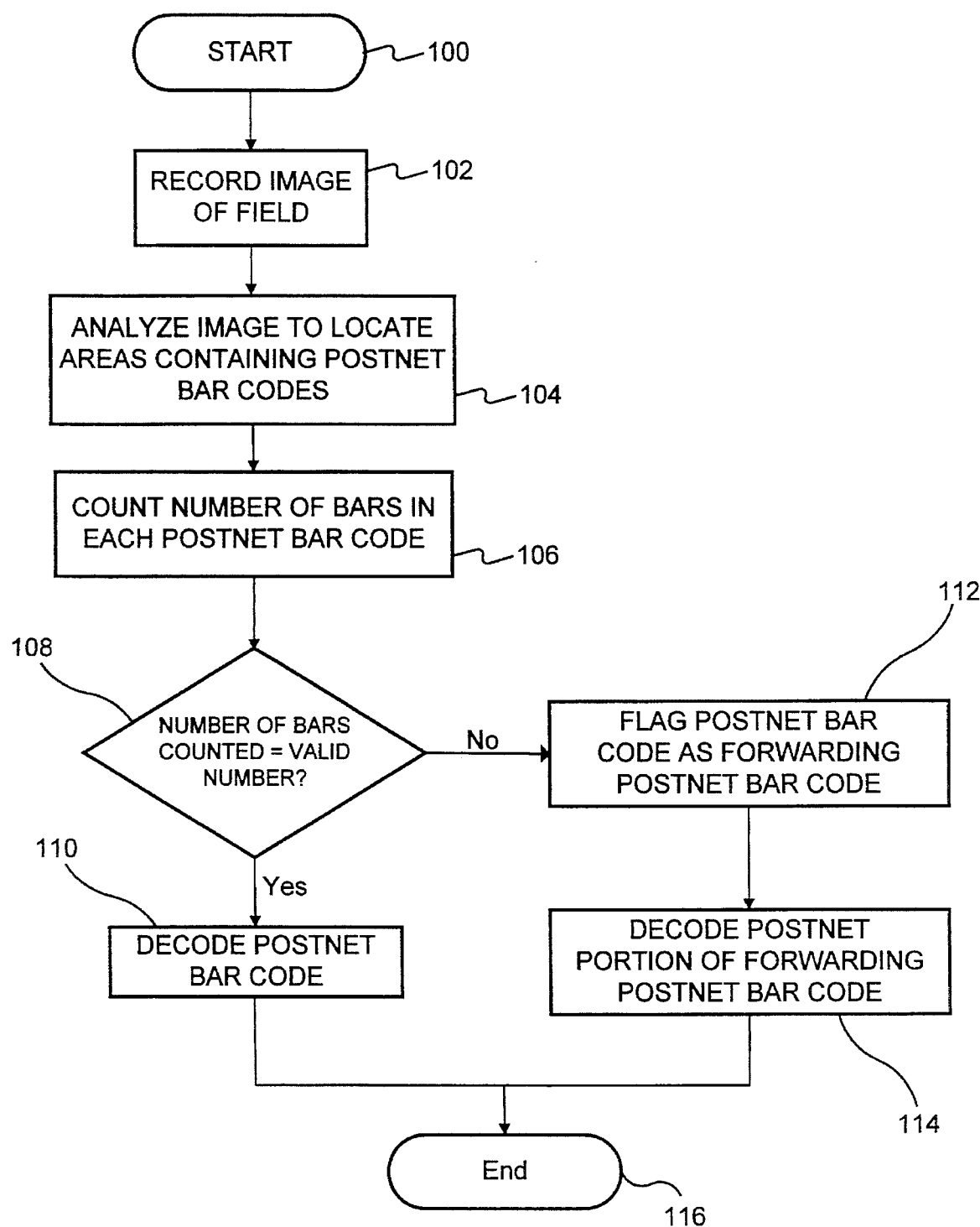
FIG. 7 is a flowchart of a computer program used in the preferred embodiment of FIG. 5 for locating and decoding Postnet forwarding bar codes in a field of Postnet bar codes.

FIG. 7 is a flowchart of a program for causing the processor 62 (FIG. 5) to locate multiple Postnet bar code symbols in a field, such as the face of an envelope, and then decode the Postnet portion of the forwarding bar code if a forwarding bar code is present or, alternatively, if a forwarding Postnet barcode is not present, decode the original Postnet barcode. The program is entered at 100 and, at 102, the processor 62 (FIG. 5) records in memory 64 an image of the field as taken by the imager 60. After the image of the field has been recorded, the image is analyzed at step 104 as described above to locate areas in the field containing Postnet bar codes. The processor 62 then counts the number of bars in each Postnet bar code at 106 and determines at step 108 whether the number of bars counted in each bar code is equal to a valid number of Postnet bar codes. As is well known by one skilled in the art, Postnet bar codes have preset numbers of bars corresponding to the preset number of digits in various ZIP code formats. Thus, for example, there are five-digit ZIP codes that are coded using a first number of Postnet bars and nine-digit ZIP codes that are coded with a second number Postnet bars. If the field contains only a Postnet bar code having a valid number of bars, the Postnet bar code is decoded at 110 and the program exits through step 116. If, however, a Postnet bar code containing a number of bars different from a valid number of bars is found at step 108, the program branches to step 112 where such Postnet bar code is flagged as a forwarding Postnet bar code. The Postnet portion of the forwarding Postnet bar code (i.e., the forwarding Postnet bar code ignoring the extra bars) is then decoded at step 114 before exiting through 116. Thus, if the image recorded in the field 102 contains an original Postnet bar code and a forwarding Postnet bar code the forwarding Postnet bar code rather than the original Postnet bar code is decoded.

Thus a bar code reader has been disclosed which is capable of reading and distinguishing first and second bar code symbols that are contained and randomly oriented anywhere within the field of view of an image area.

What is claimed is:

1. In a bar code reader, an apparatus for locating and decoding in a field on a document a Postnet bar code designating a zip code address, said Postnet bar code appearing either alone or as part of a forwarding bar code, said Postnet bar code consisting of one of several valid numbers of bars, said forwarding bar code composed of a Postnet bar code designating a forwarding address zip code followed or preceded by a number of bars with the total number of bars in said forwarding bar code being different from any of said valid number of bars, said apparatus comprising:

means for recording an image of the field in a memory;

means for analyzing the image recorded in the memory to locate areas in the field that potentially contain all of the bar codes in the field;

means responsive to said means for analyzing for counting the number of bars in each bar code and identifying as said forwarding Postnet bar code a bar code having a number of bars different from any of said valid numbers of bars; and means responsive to said means for analyzing and said means for counting for decoding said Postnet bar code appearing alone if said means for counting did not identify a forwarding bar code in said field and for decoding said Postnet bar code appearing as pan of said forwarding bar code if said means for counting identified a forwarding bar code in said field whereby said means for analyzing is used both to identify said forwarding bar codes and to decode said Postnet bar codes.

2. The apparatus of claim 1 wherein said bars both follow and precede the Postnet bar code appearing in said forwarding bar code.

3. The apparatus of claim 1 wherein said means for counting further identifies a bar code in said field as a forwarding bar code only if the total number of bars in said bar rode is a predetermined number.

4. The apparatus of claim 3 wherein the predetermined number of bars in said bar code is the sum of said one of several valid numbers of bars and a prescribed number of bars.

5. The apparatus of claim 4 wherein said prescribed number of bars is 10.

6. A method of locating and decoding in a field on a document a Postnet bar code designating a zip code address, said Postnet bar code appearing either alone or as part of a forwarding bar code, said Postnet bar code consisting of one of several valid numbers of bars, said forwarding bar code composed of a Postnet bar code designating a forwarding address zip code followed or preceded by a number of bars with the total number of bars in said forwarding bar code being different from any of said valid number or bars, said method comprising:

recording an image of the field in a memory;

analyzing the image recorded in the memory to locate areas in the field that potentially contain all of the bar codes in the field;

counting the number of bars in each of the bar codes both to identify as said forwarding bar code a bar code having a number of bars different from any of said valid number of bars; and decoding said Postnet bar code appearing as part of said forwarding bar code if a forwarding bar code was identified in said field and for decoding said Postnet bar code appearing alone if a forwarding bar code was not identified in said field whereby said step of analyzing said image is used both to identify forwarding bar codes and to decode Postnet bar codes.

7. The method of claim 6 wherein said bars both follow and precede the Postnet bar code appearing in said forwarding bar code.

8. The method of claim 6, further including the steps of determining if the total number of bars in each bar code in said field is a predetermined number and identifying a bar code as a forwarding bar code only if the total number of bars in said bar code is a predetermined number.

9. The method of claim 8 the predetermined number of bars in said forwarding bar code is the sum of said one of several valid numbers of bars and a prescribed number of bars.

10. The method of claim 9 wherein said prescribed number of bars is 10.

\* \* \* \* \*

UNITED STATES PATENT AND TRADEMARK OFFICE
CERTIFICATE OF CORRECTION

PATENT NO. : 5,468,945

DATED : November 21, 1995

INVENTOR(S) : George R. Huggett and William M. McDonald

It is certified that error appears in the above-indentified patent and that said Letters Patent is hereby corrected as shown below:

In column 5, claim 1, line 60, delete "pan" and substitute therefor --part--.

In column 6, claim 3, line 12, delete "rode" and substitute therefor --code--.

Signed and Sealed this

Fifth Day of March, 1996

Attest:

BRUCE LEHMAN

Attesting Officer

Commissioner of Patents and Trademarks